(12) United States Patent
Sifferman et al.

(10) Patent No.: US 6,492,305 B2
(45) Date of Patent: Dec. 10, 2002

(54) METHOD OF CONTROLLING LOSS OF A SUBTERRANEAN TREATMENT FLUID

(75) Inventors: Thomas R. Sifferman, El Cajon, CA (US); John M. Swazey, San Diego, CA (US); C. Bryan Skaggs, San Diego, CA (US); Nina Nguyen, Middlesex, NJ (US); Daniel B. Solarek, Belle Mead, NJ (US)

(73) Assignees: CP Kelco U.S., Inc., Wilmington, DE (US); National Starch and Chemical Investment Holding Corporation, Wilmington, DE (US)

( * ) Notice: Subject to any disclaimer, the term of this patent is extended or adjusted under 35 U.S.C. 154(b) by 3 days.

(21) Appl. No.: 09/767,852

(22) Filed: Jan. 24, 2001

(65) Prior Publication Data

US 2001/0005709 A1 Jun. 28, 2001

Related U.S. Application Data

(63) Continuation of application No. 08/901,805, filed on Jul. 28, 1997, now Pat. No. 6,180,571.

(51) Int. Cl.$^7$ .............................. C09K 7/02; C09K 7/06
(52) U.S. Cl. ...................... 507/212; 507/110; 507/111; 507/114; 507/124; 166/270; 166/275; 166/282; 166/283; 166/400
(58) Field of Search ................................. 507/212, 110, 507/111, 124, 114; 166/270, 275, 282, 283, 400

(56) References Cited

U.S. PATENT DOCUMENTS

| | | | |
|---|---|---|---|
| 3,993,570 A | 11/1976 | Jackson et al. | 507/111 |
| 4,090,968 A | 5/1978 | Jackson et al. | 507/111 |
| 4,280,851 A | 7/1981 | Pitchon et al. | 127/33 |
| 4,422,947 A | 12/1983 | Dorsey et al. | 507/111 |
| 4,600,472 A | 7/1986 | Pitchon et al. | 159/4.4 |
| 4,610,760 A | 9/1986 | Kirkpatrick et al. | 159/4.01 |
| 4,652,384 A | 3/1987 | Francis et al. | 252/8.51 |
| 4,822,500 A | 4/1989 | Dobson, Jr. et al. | 507/212 |
| 4,997,581 A | 3/1991 | Wiliamson et al. | 507/212 |
| 5,009,267 A | 4/1991 | Williamson et al. | 166/271 |
| 5,149,799 A | 9/1992 | Rubens | 536/102 |
| 5,616,541 A | 4/1997 | Dobson, Jr. et al. | 507/145 |
| 5,641,728 A | 6/1997 | Dobson, Jr. et al. | 507/111 |
| 5,804,535 A | 9/1998 | Dobson et al. | 507/111 |
| 5,851,959 A | 12/1998 | Bernu | 507/111 |

FOREIGN PATENT DOCUMENTS

| | | |
|---|---|---|
| EP | 0758011 | 2/1997 |
| EP | 0770660 | 5/1997 |
| EP | 0786507 | 7/1997 |

*Primary Examiner*—Jill Warden
*Assistant Examiner*—Latoya I. Cross
(74) *Attorney, Agent, or Firm*—Fitzpatrick, Cella, Harper & Scinto LLP

(57) ABSTRACT

Selectively cross-linked starches are disclosed that are useful as fluid loss control additives in subterranean treatment fluids comprising starches that cross-linked to a Brabender peak viscosity of about 800 to about 1250 Brabender units after about 40 to about 70 minutes at about 92° C. and provide good fluid loss control over a temperature range of from about 20° C. to about 160° C. (68° F. to 320° F.).

16 Claims, No Drawings

METHOD OF CONTROLLING LOSS OF A SUBTERRANEAN TREATMENT FLUID

This application is a continuation of U.S. patent application Ser. No. 08/901,805, filed Jul. 28, 1997, now U.S. Pat. No. 6,180,571.

BACKGROUND OF THE INVENTION

1. Field of the Invention

This invention relates to cross-linked starches that are useful as fluid loss control additives for aqueous-based subterranean treatment fluids, such as drilling, workover and completion fluids.

2. Related Background Art

The cross-linked starches of this invention may be advantageously used in oil field applications. Particularly, the starches may be incorporated into fluids used in operations where there is contact with a subterranean formation. Drilling, workover, and completion fluids are examples of fluids used in subterranean formations.

Drilling fluids may be used for any of several functions that allow evaluating or producing a reservoir (formation) for oil, gas, or water. The drilling fluid may be pumped into the wellbore during the drilling operation to cool the drill bit and to flush out the rock particles that are sheared off by the drill bit. A "drill-in" fluid is often used while drilling the production zone.

Workover fluids may be used to perform one or more of a variety of remedial operations on a producing oil well with the intention of restoring or increasing production. Examples of workover operations include, but are not limited to, deepening, plugging back, pulling and resetting a liner, squeeze cementing, shooting and acidizing.

Completion fluids may be used to perform one or more of a variety of oil field applications illustrated by, but not limited to, operations such as cementing, using spacers, perforating, gravel packing, installing casing, underreaming, milling and a variety of simulation techniques such as acidizing and the like.

Subterranean treatment fluids are used in well operations, particularly oil well operations, for various purposes. The subterranean treatment fluids are generally prepared at the well site by admixing a viscosifying agent and a base fluid. The viscosifying agent thickens or viscosifies the base fluid, thereby increasing the ability of the fluid to suspend or flush out the rock particles. The subterranean treatment fluid may also advantageously contain other additives that are conventionally used in well treatment operations, as needed, based upon the specific site requirements and environmental conditions.

A common problem associated with the use of subterranean treatment fluids is the loss of fluid into the surrounding formation near the wellbore. Fluid loss control additives are added to the subterranean treatment fluids to limit exposure of the formation and also control leak off of the liquid components to the surrounding subterranean formation. As a result, the subterranean treatment fluids that are most useful in well operations possess adequate high water retention capacity. Desirably, the subterranean treatment fluid should retain high water retention capacity under the often adverse environments encountered during use. For example, high temperature conditions are encountered in deep wells, where operating temperatures frequently exceed 250° F. Low temperature conditions are encountered in shallow wells or in areas of a well that are closer to the earth's surface. High salt conditions are created when brine-containing subterranean treatment fluids are used. Accordingly, the fluid loss control additive used in subterranean treatment fluids should preferably be stable in both high temperature and high salinity environments. More preferably, the fluid loss control additive should be stable over a range of temperatures and should function in environments of either high or low salinity.

Natural starches are a well known and important class of materials useful as fluid loss control additives. However, it is also well known that starches do not possess long term stability and tend to degrade when maintained at elevated temperatures. For example, at temperatures in excess of 225° F., natural or conventional starches begin to degrade, and will fail to provide adequate fluid loss control.

Several approaches have been used to increase the stability of starches to provide more stable well drilling fluids. For example, U.S. Pat. No. 4,090,968 discloses the use of quaternary ammonium starch derivatives as fluid control additives that are stable at high temperatures. These derivatives were prepared by reaction of starch with epichlorohydrin and a tertiary amine.

A thixotropic three-component well drilling fluid, consisting of a cross-linked potato starch, a heteropolysaccharide derived from a carbohydrate by bacteria of the genus Xanthomonas, and hydroxyethyl cellulose, providing improved water loss control is disclosed in U.S. Pat. No. 4,422,947.

U.S. Pat. No. 4,652,384 discloses the use of selected cross-linked starches to provide fluid loss control at elevated temperatures. The starch, which is cross-linked to a rather high degree under specified conditions, requires activation at elevated temperature for over four hours in order to achieve suitable effectiveness.

Other well treating fluid blends have been prepared by incorporating Xanthomonas gum and an epichlorohydrin cross-linked hydroxypropyl starch, as described in U.S. Pat. No. 4,822,500. This particular combination of additives interact synergistically to enhance suspension characteristics and decrease fluid loss.

U.S. Pat. No. 5,009,267 discloses fluid loss control additives for fracturing fluids composed of blends of two or more modified, or cross-linked, starches or blends of one or more natural starches with one or more modified starches.

Although many of the cross-linked starch compositions described above offer improvements over conventional starch, there remains a need in the industry for a readily dispersible starch additive that can provide good fluid loss control over a wide temperature range and that is stable in brine-containing fluids.

SUMMARY OF THE INVENTION

This invention is directed to selectively cross-linked starches and blends of these cross-linked starches that are useful as fluid loss control additives that provide good fluid loss control over a wide temperature range. More particularly, this invention is directed to fluid loss control additives for use in subterranean treatment fluids comprising starches which are cross-linked and have a Brabender peak viscosity of about 800 to about 1250 Brabender units after about 40 to about 70 minutes at about 92° C. (198° F.) and provides good fluid loss control over a wide temperature range of from about 20° C. to about 160° C. (68° F. to 320° F.). This invention is also directed to the selectively cross-linked starches that are spray-dried to further improve the starch properties. Additionally, this invention covers subterranean treatment fluids containing the defined cross-linked starches.

DETAILED DESCRIPTION OF THE INVENTION

In this invention, the ability to provide a fluid loss control additive which is effective over a wide temperature range by using a selectively cross-linked starch is demonstrated. This result is surprising and unexpected as evidenced by a review of the literature and commercially available products which show the use of various starches and modified starches, none of which suggest the particular starches of this invention or the degree of fluid loss control exhibited over an extended temperature range.

An important feature of this invention is the amount of cross-linking that the starch receives, i.e. the amount of treatment or the degree of cross-linking. While it is difficult to measure this characteristic of the treated starch, particularly at low levels, one of the best ways to determine the amount of cross-linking is to measure the viscosity of the starch. It is well known to measure the viscosity of cross-linked starch using a C. W. Brabender Visco-Amylo Graph. Using this measuring device and method, the starches of this invention are cross-linked to provide a Brabender peak viscosity of about 800 to about 1250, preferably about 920 to about 1150 Brabender units after about 40 to about 70 minutes at about 92° C. The test procedure for measuring this feature is provided below.

The cross-linked starches used in this invention may include starch treated with a number of multi-functional cross-linking agents. More particularly, the cross-linking agents used in this invention include epichlorohydrin, phosphorus oxychloride, adipic-acetic anhydrides and sodium trimetaphosphate. Epichlorohydrin and phosphorus oxychloride are preferred cross-linking agents and epichlorohydrin is most preferred.

The starches which may be used as the base material in preparing the cross-linked starch of this invention may be derived from any plant source including corn, potato, wheat, rice, sago, tapioca, waxy maize, waxy rice, and sorghum. Also useful are the conversion products derived from any of the above base materials including, oxidized starches, prepared by treatment with oxidants such as sodium hypochlorite, and fluidity or thin-boiling starches, prepared by enzyme conversions or mild acid hydrolysis. Preferred starches are corn, waxy maize, potato, wheat and tapioca, with waxy maize being especially preferred.

The cross-linked starches of the present invention are generally prepared using known techniques by reacting starch with an appropriate cross-linking agent in aqueous solution under alkaline conditions. The desired cross-linked starches will have a specified relatively low degree of cross-linking defined by Brabender viscosity as described earlier. The amount of cross-linking agent used to achieve this degree of cross-linking will vary somewhat depending of the conditions and materials used. Typically, the amount of cross-linking agent used is from about 0.05% to 0.15%, and preferably about 0.1%, by weight of the starch.

In addition to using the selectively cross-linked starches as defined herein, it has been found that pregelatinizing the starches using a spray-drying process provides a product which has enhanced properties. It is believed that the spray-dried starches possess more uniform particle size which leads to more uniform and controlled swelling. The use of the spray-dry pregelatinization methodology produces starch that possesses uniform particle size without the often significant degradation that occurs when drying and gelatinizing by drum-drying or extrusion methods.

Pregelatinization of the cross-linked starches of this invention may be accomplished by spray-drying using a steam-injection/dual- or single-atomization process described in U.S. Pat. Nos. 4,280,851, 4,600,472, or 5,149,799, the disclosures of which are incorporated by reference herein. In this process, a mixture of the granular starch is cooked or gelatinized in an atomized state. The starch which is to be cooked is injected through an atomization aperture in the nozzle assembly into the spray of atomized steam so as to heat the starch to a temperature effective to gelatinize the starch. An enclosed chamber surrounds the atomization and heating medium injection apertures and defines a vent aperture positioned to enable the heated spray of starch to exit the chamber. The arrangement is such that the lapsed time between passage of the spray of starch through the chamber, i.e. from the atomization chamber-and through the vent aperture, defines the gelatinization time of the starch. The resulting spray-dried pregelatinized starch comprises uniformly gelatinized starch in the form of indented spheres, with a majority of the granules being whole and unbroken and which swell upon rehydration. Nozzles suitable for use in the preparation of these starches are described in U.S. Pat. No. 4,610,760 which is incorporated by reference herein.

The steam injection/dual atomization process as referred to above may be more particularly described as pregelatinization of the starch by:

a) mixing the starch in an aqueous solvent, b) atomizing the mixture with an enclosed chamber, and c) interjecting a heating medium into the atomized mixture in the enclosed chamber to cook the starch, the size and shape of the chamber being effective to maintain the temperature and moisture control of the starch for a period of time sufficient to cook said starch.

A steam injection/single atomization process for cooking and spray-drying starch is disclosed in the U.S. Pat. No. 5,149,799 patent referred to above and comprises:

a) slurrying the starch in an aqueous medium, b) feeding a stream of the starch slurry at a pressure from about 50 to about 250 psig into an atomizing chamber within a spray nozzle, c) injecting a heating medium into the atomizing chamber at a pressure from about 50 to about 250 psig, d) simultaneously cooking and atomizing the starch slurry as the heating medium forces the starch through a vent at the bottom of the chamber, and e) drying the atomized starch.

It is further noted that blends of the selected cross-linked starches may be used. For example, a blend of epichlorohydrin cross-linked starch and phosphorus oxychloride cross-linked starch may be used. The proportions of the two cross-linked starches are not limited but generally a weight ratio of about 4:1 to about 1:4 of epichlorohydrin cross-linked starch to phosphorous oxychloride cross-linked starch is used. Preferably, the blend comprises a mixture of about 1:1, by weight, of the starches. The blends of the epichlorohydrin and phosphorus oxychloride cross-linked starches may be prepared by dry-mixing the separately prepared, spray-dried starches. Alternatively, the blends may be prepared by simultaneously spray-drying wet mixtures of the cross-linked starches.

The cross-linked starches of the present invention are employed in subterranean treatment fluids in an effective amount to provide fluid loss control and educe fluid loss over a broad temperature range. The effective amount of cross-linked starches will vary depending on the other components of the subterranean treatment fluid, as well as the geological characteristics and conditions of the subterranean formation in which it is employed. Typically, the cross-linked starch fluid loss control additive may be used in an amount of from about 1 pound to about 10 pounds (lbs) of starch per barrel (bbl) of the subterranean treatment fluid, preferably from about 3 to about 6 pounds per barrel. The term "barrel" as used herein means a barrel that contains 42 U.S. gallons of fluid.

In addition to the cross-linked starches, the subterranean fluids may contain other components such as a base fluid and often a viscosifying agent. The base fluid may be an aqueous system containing fresh water, seawater and/or brine. Brine is an aqueous saline solution containing soluble salts of potassium, sodium, calcium, zinc, and/or cesium and the like. The viscosifying agent may be xanthan gum, guar gum, other polymers and/or clays such as bentonite and/or mixtures of these and like materials. Other additives known to be used in these subterranean fluids include, but are not limited to, corrosion inhibitors, oxygen scavengers, antioxidants, biocides, breakers, surfactants as well as mixtures thereof and the like.

The oxygen scavengers and antioxidants may be added to subterranean treatment fluids to reduce the deleterious effects of oxygen, i.e., the oxidative degradation of the fluid loss control additive, viscosifying agent, and/or other additives. Exemplary oxygen scavengers include sodium sulfite, sodium dithionite, potassium metabisulfite, and the like. Exemplary antioxidants include magnesium oxide, triethanolamine (TEA), tetraethylene pentamine (TEPA), and the like. Addition of oxygen scavengers or antioxidants to subterranean treatment fluids may provide fluids possessing enhanced viscosity and fluid loss control properties, such that excellent fluid loss control may be maintained over a broad range of temperatures.

The amounts or proportions of each of the components and additives used in the subterranean treatment fluid will vary greatly depending on the intended use and purpose of the treatment fluid as well as the geological characteristics and conditions of the subterranean formation in which the fluid is employed. However, the amount of base fluid generally present in the fluid is about 25% to about 99% by weight of the fluid. The viscosifying agent may be present in an amount of about 0% to about 20% by weight of the fluid. Other additives, such as those listed above, may be present in a treatment fluid generally in an amount of about 0% to about 10% by weight of the fluid.

Subterranean treatment fluids for specific purposes require special additives. For instance, drilling fluids may also have weighting agents, such as barite, to control the pressure of the formation. Further information on the composition of drilling fluids can be found in the Fifth Edition (1988) of "Composition and Properties of Drilling and Completion Fluids" by Darley and Gray, the disclosure of which is incorporated by reference herein. Oil well cement slurries may also be classified as subterranean fluids and often contain Portland cement, retarders, accelerators and similar products. Weighting agents in drilling fluids and cementing agents in slurries or spacer fluids may be used in amounts up to about 50% or more, by weight of the fluid, depending on the requirements of the geological formation. Further information on the composition of cement slurries can be found in the 1987 SPE Monograph on "Cementing" by D. K. Smith, the disclosure of which is incorporated by reference herein. Acidizing fluids would include acid, typically in amounts of about 1 to about 37% by weight, to etch the formation. The 1979 SPE Monograph "Acidizing Fundamentals" by Williams et al., the disclosure of which is incorporated by reference herein, further describes the uses and composition of acidizing fluids. Similarly, other special purpose additives could be used for other applications.

The subterranean treatment fluids of this invention contain the cross-linked starch or starch blend, and any viscosifying agent, base fluid and other additive components, present in such proportions that are appropriate for the specific well site as determined by those skilled in the art. For example, a typical drilling fluid containing the fluid loss control additives of the present invention may be prepared by admixing 4 pounds of the cross-linked starch of this invention, 0.8 pounds of high viscosity polyanionic cellulose, 1.1 pounds of xanthan gum and 50 pounds of calcium carbonate into 1 barrel (42 U.S. gallons) of water or brine.

As described above, the cross-linked starch fluid loss additives of this invention provide good fluid loss control over a broad temperature range and in an environment where salinity, shear and high temperature tolerance are often required. While the degree of fluid loss is a relative term depending on actual conditions of operation, a fluid loss of less than about 100 g, as shown by the low temperature-low pressure (LTLP) API and the high temperature high pressure (HTHP) API tests as described below, has resulted when using the cross-linked starch additives of this invention. This level of fluid loss control has been found to occur over a broad temperature range of about 20° C. to about 150° C. (68° F. to 302° F.) in the moderate to high salinity environment of sea water or saturated sodium chloride solution, used as base fluids. Addition of oxygen scavengers or antioxidants to subterranean treatment fluids containing the cross-linked starches of this invention may provide enhanced fluid loss control over a wider temperature range, e.g. up to about 160° C. (320° F.). Use of higher concentrations of fluid loss control additive and/or viscosifying agent in the subterranean treatment fluids of this invention may similarly increase fluid loss control at very high temperatures.

The examples which follow are intended as an illustration of certain preferred embodiments of the invention, and no limitation of the invention is implied. In these examples, the concentration of reagents and composition components are expressed as parts by weight, unless otherwise provided. All temperatures are reported in degrees Celsius unless otherwise noted.

The following test procedures were used in evaluating cross-linked starch fluid loss control additives in accordance with this invention.

Brabender Viscometer Test

A Brabender Visco-Amylo Graph is used in this procedure. This is a standard device, readily available on the open market, and is a recording, rotating cup torsion viscometer that measures and records apparent viscosity at fixed temperatures or temperature varied at a uniform rate.

The procedure for evaluating the cross-linked starch is as follows:

1) A sample of the cross-linked starch, prior to pregelatinization via spray-drying, is slurried into a solution containing distilled water and glacial acetic acid (2.06% by weight of total charge) to 6.0% anhydrous solids content by total weight, 2) The sample is transferred to the Brabender cup. The cup is then inserted into the viscometer, 3) The glass/mercury thermoregulator is set at 92° C. (198° F.) and the sample is heated at a rate of four degrees per minute to 92° C. The sample is is then held at about 92° C. until the sample reaches the peak viscosity, and 4) The peak viscosity is recorded. Also recorded is the time, in minutes, that it takes for the sample to reach peak viscosity after it reaches 92° C. (that is, the total time the sample is at 92° C. until the sample reaches peak viscosity).

Fluid Loss Testing Procedure

Fluid Preparation

The starch fluid loss control additives were tested in two aqueous systems: seawater and 26% (w/w; saturated) NaCl brine. The seawater was prepared by dissolving 18.88 g of dry "Sea-Salt" (ASTM D-1141-52, Lake Products Company, Maryland Heights, Mo.) into 450 g prepared tap water (the prepared tap water is deionized water containing 1000 ppm NaCl and 110 ppm $CaCl_2$). The 26% NaCl base fluid was prepared by dissolving 141.4 g of NaCl into 398.6 g of deionized water.

Prior to salt addition, prepared tap water or deionized water was added to Hamilton Beach malt mixing cups and mixed at approximately 4000 rpm with a Hamilton Beach malt mixer. A 1.1 lb/bbl amount of xanthan gum (1.43 g XCD, a product of NutraSweet Kelco Co., a unit of Monsanto Company, St. Louis. Mo.) was added into each mixing cup and allowed to mix for approximately 3–5 minutes. One drop of 5 M potassium hydroxide was added to each mixing cup to raise the pH to between 8.5–9 and the mixture mixed for 20 minutes at 11,000±200 rpm. At the end of the 20 minutes of mixing, the appropriate amount of either "Sea-Salt" or NaCl was added and the fluid was mixed an additional 10 minutes at 11,000 rpm.

A 0.8 lb/bbl amount of AquaPAC®—Regular, which is a high viscosity polyanionic cellulose used as a viscosity and filtration control aid (1.07 g; a product of Aqualon Co., Houston, Tex.) and a 4 lb/bbl starch sample (5.14 g), prepared as described below, were dry blended together with a spatula, then added to the fluid mixture. Mixing was continued at 11,000 rpm for minutes. The mixing container was removed from the mixer and 50 lb/bbl CC-103 (64.29 g, calcium carbonate, a product of the ECC International Co., Sylacauga, Ala.) was added. The mixing cup was returned to the mixer and mixed for an additional 5 minutes at 11,000 rpm. Octanol (two drops, defoamer) was added and the resulting mixture was mixed for an additional minute. Finally, the pH of the fluid was adjusted with 5 M potassium hydroxide to obtain a pH between 8.5 and 9.

Low Temperature/Low Pressure (LTLP) API Fluid Loss Test Procedure

Un-aged samples of the fluid prepared above were tested for fluid loss using a standard American Petroleum Institute (API) low temperature-low pressure (LTLP) Fluid Loss Test at room temperature (72° F./22° C.).

Samples of test fluid (300 ml.) were re-mixed using a Hamilton Beach Mixer for approximately 1 minute at 11,000 rpm, then poured into an API Fluid Loss filter cell (Fann Instrument Company, Houston, Tex., Model 12B, No. 30501) to about a half-inch from the top of the cell. An O-ring and Wattman 50 filter paper were placed in the cell prior to sealing the cell.

The API LTLP Fluid Loss Test was performed at room temperature as follows. The cell was placed on a filter press, pre-set at 100 psi using nitrogen pressure, and pressurized for 30 minutes. Fluid lost from the pressurized cell was collected in a tared beaker and weighed.

High Temperature/High Pressure (HTHP) Fluid Loss Test Procedure

Prior to conducting the HTHP API fluid loss test, the samples were aged for 16 hours at elevated temperatures, as follows.

Heat Rolling Procedure

The fluid containing the test starch sample was poured into a 260 ml. high-temperature aging cell (Fann Instrument Co., Houston, Tex., Part No. 76000). The cell is made of stainless steel. The fluid filled the cell to approximately one-quarter inch from the top of the cell. The cell was capped and the outlet cap was screwed on. The cell was pressurized to about 150–200 psi and then the valve stem was carefully tightened. The cell was then placed in the roller oven (Fann Instrument Co., Houston, Tex., Part No. 7000) that had been preheated to the test temperature. The roller oven is a standard API roller oven except that Eurotherm temperature controllers (Eurotherm Corp., Reston, Va., Model 808) were added to reduce the temperature variance during aging. The cell was rolled at the test temperature for 16 hours (overnight). The sample was removed from the oven, cooled to room temperature, depressurized, then tested for high temperature/high pressure (HTHP) fluid loss as described below.

High Temperature/High Pressure (HTHP) API Fluid Loss Test

The cooled sample was placed in a cool 175 ml HTHP fluid loss cell (Fann Instrument Co., Part No. 38750) containing a Wattman 50 (or equivalent) filter paper. The bottom valve stem of the cell was closed to prevent loss of the fluid prior to heat up. The top cap was attached and the cell placed in a preheated cell holder. A nitrogen pressure line was attached to the top valve stem and the cell was pressurized to approximately 200 psi to prevent boiling of the fluid during heat up. Once the cell reached temperature, a condenser was added to the bottom valve stem of the cell and a back pressure of 100 psi nitrogen pressure was added to the condenser. The bottom valve stem of the cell was then opened to allow fluid loss to occur and the pressure of the top valve stem was increased to 600 psi (to provide 500 psi differential pressure). Fluid loss was measured over a 30 minute time period or until complete fluid loss occurred, whichever comes first. The fluid loss was measured by weight. The fluid loss reported was exactly two times the fluid los s collected (as per API procedures) to compensate for the smaller surface area of the filter paper compared to the low temperature, low pressure fluid loss cell.

Differences between LTLP and HTHP Testing

Testing was conducted as per "API Recommended Practice, Standard Procedure for Field Testing Water-Based Drilling Fluids," API RP 13B-1, First Edition, Jun. 1, 1990. Room temperature (72° F./22° C.) fluid loss tests were conducted using the API low-temperature/low-pressure (LTLP) test procedure (API Proc. RP 13B-1 Sect. 3.3). All fluid loss testing above room temperature was done using the API high-temperature/high-pressure (HTHP) test procedure (API Proc. RP 13B-1 Sect. 3.5). The HTHP testing uses different equipment than the LTLP test which allows for heating of the filter press and higher differential pressures. The HTHP testing uses 500 psi differential pressure whereas the LTLP apparatus uses 100 psi differential. Also, the HTHP uses filter paper that is one-half the surface area of the LTLP test and, therefore, the fluid loss reported for HTHP testing is doubled that collected.

EXAMPLE 1

Preparation and Testing of Epichlorohydrin Cross-Linked Starch

At room temperature, 1000 g of waxy maize starch was slurried in 1500 g of water. To the slurry, sodium hydroxide, as a 3% solution, was slowly added to a pH of about 12.0 (25 ml. of reaction slurry should require 18–20 ml. of 0.1 N HCl to neutralize at the phenolphthalein end point). Epichlorohydrin (0.13% by weight) was added to the slurry.

The reaction mixture was allowed to react at 40° C. for hours cooled to room temperature, and neutralized to a pH of 6.0 with 10–30% solution of hydrochloric acid. The starch was then filtered, washed and dried to provide an ungelatinized dry powder. A sample of the cross-linked starch was analyzed to determine its peak viscosity using a C. W. Brabender Visco-Amylo Graph, as described above, and found to have a peak viscosity of 1020 Brabender units after 52 minutes at 92° C.

The dried cross-linked starch was slurried in water to 20–30% anhydrous solids by weight. The starch was spray-dried to pregelatinize, using the process described above, and in U.S. Pat. Nos. 4,280,851 and 4,600,472.

The resulting dried, pregelatinized powder was tested for fluid loss using both the API LTLP fluid loss test (room temperature of 72° F./22° C.) and the API HTHP test, described above. The test was in both seawater and saturated NaCl solution (26%) and gave the results shown below in Tables 1 and 2.

TABLE 1

Epichlorohydrin Cross-Linked
Starch/Sea Water Fluid Loss

| Temperature (° F.) | Fluid Loss (g) |
|---|---|
| 72 (22° C.) | 6.4 |
| 100 (38° C.) | 6.9 |
| 150 (66° C.) | 12.5 |
| 175 (80° C.) | 18.5 |
| 225 (107° C.) | 46.1 |
| 250 (121° C.) | 45.7 |
| 270 (132° C.) | 57.0 |
| 290 (143° C.) | 64.8 |

TABLE 2

Epichlorohydrin Cross-Linked
Starch/NaCl Solution[1] Fluid Loss

| Temperature (° F.) | Fluid Loss (g) |
|---|---|
| 72 (22° C.) | 4.9 |
| 100 (38° C.) | 6.9 |
| 150 (66° C.) | 9.1 |
| 175 (80° C.) | 21.3 |
| 225 (107° C.) | 48.7 |
| 250 (121° C.) | 64.7 |
| 270 (132° C.) | 55.0 |
| 290 (140° C.) | 15.3 |

[1]Saturated aqueous NaCl (26%) solution

EXAMPLE 2

Preparation and Testing of Phosphorus Oxychloride Cross-Linked Starch

At room temperature, 1000 g of waxy maize starch was slurried into an aqueous solution of sodium chloride (1500 g water, 0.5W NaCl by weight of starch). To this slurry, a 3% solution of sodium hydroxide was slowly added to a pH of about 12.0 (25 ml. of reaction slurry should require 16–18 ml. of 0.1 N HCl to neutralize at the phenolphthalein end point). Phosphorus oxychloride (0.1) was added and the reaction mixture allowed to react for 35 minutes. The resulting reaction mixture was neutralized to a pH of 6.0 with a 10–30% solution of hydrochloric acid. The starch was then filtered, washed and dried. A sample of the cross-linked starch was analyzed to determine its peak viscosity using a C. W. Brabender Visco-Amylo Graph and found to have a peak viscosity of 1000 Brabender units after about 40 minutes at 92° C. The cross-linked starch was spray-dried and tested for fluid loss as in Example 1 with the results shown below in Tables 3 and 4.

TABLE 3

Phosphorus Oxychloride
Cross-Linked Starch/Sea Water Fluid Loss

| Temperature (° F.) | Fluid Loss (g) |
|---|---|
| 72 (22° C.) | 6.2 |
| 250 (121° C.) | 8.1 |
| 260 (127° C.) | 23.9 |

TABLE 4

Phosphorus Oxychloride
Cross-Linked Starch/NaCl Solution[1] Fluid Loss

| Temperature (° F.) | Fluid Loss (g) |
|---|---|
| 72 (22° C.) | 5.3 |
| 250 (121° C.) | 21.0 |
| 260 (127° C.) | 75.6 |

[1]Saturated aqueous NaCl (26%) solution

EXAMPLE 3

A blend (1:1 wt. ratio) of epichlorohydrin (epi) cross-linked starch and phosphorus oxychloride cross-linked starch (both prepared as in Examples 1 and 2) was made and tested for fluid loss in sea water and saturated NaCl solutions as in the previous Examples. The results are shown below in Tables 5 and 6.

TABLE 5

Blend of Epi/Phosphorus Oxychloride
Cross Linked Starches (1:1)
in Sea Water Fluid Loss

| Temperature (° F.) | Fluid Loss (g) |
|---|---|
| 72 (22° C.) | 6.9 |
| 100 (38° C.) | 6.1 |
| 150 (66° C.) | 15.7 |
| 250 (121° C.) | 33.8 |
| 290 (143° C.) | 47.9 |

TABLE 6

Blend of Epi/Phosphorous Oxychloride
Cross-Linked Starches (1:1)
in NaCl Solution[1] Fluid Loss

| Temperature (° F.) | Fluid Loss (g) |
|---|---|
| 72 (22° C.) | 5.0 |
| 100 (38° C.) | 6.3 |
| 150 (66° C.) | 9.7 |
| 250 (121° C.) | 31.0 |

[1]Saturated aqueous NaCl (26%) solution

Other variations or modifications, which will be obvious to those skilled in the art, are within the scope and teachings of this invention. This invention is not to be limited except as set forth in the following claims.

We claim:

1. A method for controlling fluid loss of a subterranean treatment fluid in a subterranean formation, said method comprising the step of introducing the subterranean treatment fluid into the subterranean formation, wherein said subterranean treatment fluid includes a fluid loss control additive comprising a pre-gelatinized cross-linked starch that provides fluid loss control over a temperature range of from about 20° C. to about 160° C. and prior to pre-gelatinization, said starch has a Brabender peak viscosity of from about 800 to about 1250 Brabender viscosity units after about 40 to about 70 minutes at about 92° C. when subjected to a Brabender viscometer test.

2. The method according to claim 1, wherein the subterranean treatment fluid is a drilling fluid, a workover fluid or a completion fluid.

3. The method according to claim 1, wherein the starch is cross-linked with an agent selected from the group consisting of epichlorohydrin, phosphorus oxychloride, adipic-acetic anhydride and sodium trimetaphosphate.

4. The method according to claim 3, wherein the starch is selected from the group consisting of corn, waxy maize, potato, wheat and tapioca.

5. The method according to claim 4, wherein the starch is waxy maize.

6. The method according to claim 5, wherein the cross-linked starch has a Brabender peak viscosity of from about 920 to about 1150 Brabender units after about 40 to about 70 minutes at about 92° C.

7. The method according to claim 6, wherein the cross-linked starch exhibits a fluid loss of less than about 100 g when subjected to a low-temperature-low pressure (LTLP) or high temperature high pressure (HTHP) American Petroleum Institute Fluid Loss Test over a temperature range of from about 20° C. to about 160° C.

8. The method according to claim 1, wherein the starch is cross-linked with epichlorohydrin and the starch is waxy maize.

9. The method according to claim 7, wherein the starch is cross-linked with epichlorohydrin and the starch is waxy maize.

10. The method according to claim 1, wherein the cross-linked starch is present in an amount of from about 1 pound per barrel to about 10 pounds per barrel of subterranean treatment fluid.

11. The method according to claim 10, wherein the cross-linked starch is present in an amount of from about 3 pounds per barrel to about 6 pounds per barrel of subterranean treatment fluid.

12. The method according to claim 10, wherein the cross-linking agent is epichlorohydrin and the starch is waxy maize starch.

13. The method according to claim 1, wherein the cross-linked starch is about a 4:1 to about a 1:4 by weight blend of epichlorohydrin cross-linked starch and phosphorus oxychloride cross-linked starch.

14. The method according to claim 13, wherein the cross-linked starch is about a 1:1 by weight blend of epichlorohydrin cross-linked starch and phosphorus oxychloride cross-inked starch.

15. The method according to claim 13, wherein the starch in the epichlorohydrin cross-linked starch and the phosphorus oxychloride cross-linked starch is waxy maize starch.

16. The method according to any of claims 1–15, wherein the cross-linked starch is pregelatinized by spray-drying.

* * * * *